United States Patent [19]

Bohler et al.

[11] 4,072,700
[45] Feb. 7, 1978

[54] AZOMETHINE COPPER COMPLEXES

[75] Inventors: Hans Bohler, Rheinfelden; Rolf Griesser, Binningen, both of Switzerland

[73] Assignee: Sandoz Ltd., Basel, Switzerland

[21] Appl. No.: 611,615

[22] Filed: Sept. 9, 1975

[30] Foreign Application Priority Data

Sept. 16, 1974 Sweden .................. 7412571

[51] Int. Cl.$^2$ ............................. C07F 1/08
[52] U.S. Cl. ................... 260/438.1; 106/20; 106/288 Q; 260/429 C
[58] Field of Search .......... 260/438.1, 429 C; 106/288 Q

[56] References Cited

U.S. PATENT DOCUMENTS

| | | | |
|---|---|---|---|
| 2,116,913 | 5/1938 | Schmidt et al. | 260/438.1 X |
| 2,282,936 | 5/1942 | Chenicek | 260/429 C X |
| 2,442,200 | 5/1948 | Downing et al. | 260/438.1 |
| 3,677,782 | 7/1972 | Macpherson et al. | 260/438.1 X |
| 3,700,709 | 10/1972 | Inman et al. | 260/438.1 |
| 3,891,685 | 6/1975 | Hari et al. | 260/438.1 |

FOREIGN PATENT DOCUMENTS

| | | | |
|---|---|---|---|
| 1,123,859 | 8/1968 | United Kingdom | 260/438.1 |
| 1,122,938 | 8/1968 | United Kingdom | 260/438.1 |

*Primary Examiner*—Helen M. S. Sneed
*Attorney, Agent, or Firm*—Gerald D. Sharkin; Richard E. Vila; Thomas C. Doyle

[57] ABSTRACT

Disclosed are compounds of formula I,

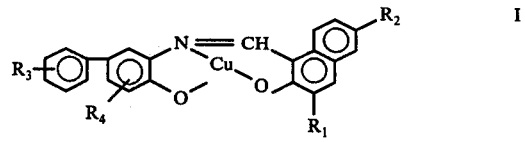

wherein
$R_1$ is hydrogen, carboxy, alkoxycarbonyl, aminocarbonyl, mono- or dialkylaminocarbonyl, benzimidazolonyl-5-aminocarbonyl or phenylaminocarbonyl, the phenyl radical of which is unsubstituted or substituted by up to 3 substituents selected from up to 3 from chlorine, bromine and methyl and up to 2 from cyano, nitro, methoxy, ethoxy and trifluoromethyl,
$R_2$ is hydrogen, halogen, alkoxy or nitro, and
$R_3$ and $R_4$ are, independently, hydrogen, halogen, nitro, alkyl, alkoxy, alkoxycarbonyl, aminocarbonyl, mono- or dialkylaminocarbonyl, phenylaminocarbonyl, alkylcarbonylamino, alkoxycarbonylamino, benzoylamino or benzylcarbonylamino, their production and use as pigments for plastics, paper, paints, varnishes, spin dyeing of cellulose acetate, textile coating and pigment printing.

7 Claims, No Drawings

AZOMETHINE COPPER COMPLEXES

IMPROVEMENTS IN OR RELATING TO ORGANIC COMPOUNDS

The invention relates to azomethine copper complexes.

The invention provides compounds of formula I

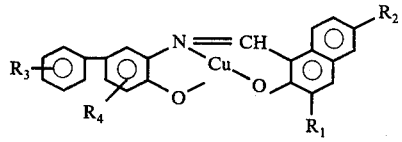

wherein
R₁ is hydrogen, carboxy, alkoxycarbonyl, aminocarbonyl, mono- or dialkylaminocarbonyl, benzimidazolonyl-5-aminocarbonyl or phenylaminocarbonyl, the phenyl radical of which is unsubstituted or substituted by up to 3 substituents selected from up to 3 from chlorine, bromine and methyl and up to 2 from cyano, nitro, methoxy, ethoxy and trifluoromethyl, R₂ is hydrogen, halogen, alkoxy, or nitro, and R₃ and R₄ are, independently, hydrogen, halogen, nitro, alkyl, alkoxy, alkoxycarbonyl, aminocarbonyl, mono- or dialkylaminocarbonyl, phenylaminocarbonyl, alkylcarbonylamino, alkoxycarbonylamino, benzoylamino or benzylcarbonylamino.

Any alkyl radical or moiety in the compounds of formula I preferably contains 1 to 4, more preferably 1 or 2, carbon atoms.

By halogen is to be understood fluorine, chlorine and bromine, of which chlorine and bromine are preferred.

In the compounds of formula I, R₁ is preferably hydrogen, carboxy or phenylaminocarbonyl, the phenyl radical of which is unsubstituted or substituted by up to 2 substituents selected from chlorine, bromine, methyl, methoxy, ethoxy, cyano and nitro. More preferably R₁ is hydrogen or carboxy, most preferably hydrogen.

R₂ is preferably hydrogen, chlorine, bromine, methoxy, ethoxy or nitro, more preferably hydrogen.

R₃ and R₄, independently, are preferably hydrogen, chlorine, bromine, methoxy or ethoxy, more preferably both being hydrogen.

In the most preferred compound of formula I, R₁, R₂, R₃ and R₄ are all hydrogen.

The invention also provides a process for the production of compounds I, comprising
a. metallising a compound of formula II,

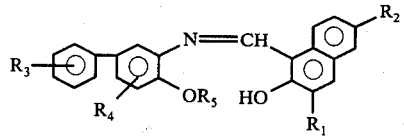

wherein
R₁ to R₄ are as defined above, and
R₅ is hydrogen, methyl or ethyl, employing copper II ions, or
b. condensing a compound of formula III

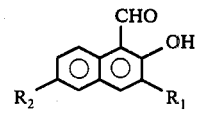

where R₁ and R₂ are as defined above,
with a compound of formula IV

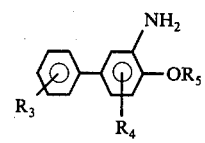

where R₃ to R₅ are as defined above,
in the presence of copper II ions.

Process (a) is suitably carried out in water or in an organic solvent, e.g. ethyl alcohol or dimethyl formamide, or in mixtures of water and an organic solvent. Optionally the reaction is carried out in the presence of a base, e.g. sodium acetate.

Process (b) is suitably carried out at between 15° and 200° C. It is conveniently carried out in an aqueous medium or in an inert organic solvent, e.g. an aprotic solvent, medium, in particular in an acyl amide solvent such as dimethyl formamide. In such reaction the copper II ions, if desired, may be caused first to react with one or the other of compounds III or IV, the other compound subsequently being added to the reaction medium.

The copper II ions employed in processes (a) and (b) are conveniently provided by copper acetate, copper sulphate or copper chloride, although, as will be appreciated, other copper II ion sources may be employed.

The resulting compounds of formula I may be isolated and purified in conventional manner, their isolation being facilitated by their relatively high insolubility in the reaction media.

The compounds of formula II, employed in process (a) are conveniently produced by condensing a compound of formula III with a compound of formula IV. Such condensation is suitably carried out following the procedure of process (b), above, in the absence of copper II ions. If desired, the compounds of formula II may be isolated in conventional manner. Alternatively, they need not be isolated but used in non-isolated form in process a).

The compounds of formulae III and IV are known or may be obtained in conventional manner from available starting materials.

The compounds of formula I are useful as pigments, being suitable for the dyeing of plastics in the mass, i.e. plastics or synthetic resins containing or free from solvents, particularly polyethylene, polystyrene, polyvinyl chloride, rubber and synthetic leathers; for pigmenting oil or water-based paints and varnishes and for spin-dyeing of cellulose acetate. They may also be used in printing inks for the graphic trade, for the dyeing of paper in the stock, for the coating of textiles and for pigment printing. For such uses, conventional methods of application and conventional amounts of the compounds of formula I may be employed.

The dyeings obtained possess desired properties such as fastness to heat, light and weather, resistance to chemicals, fastness to migration, blooming, over-varnishing the solvents. The compounds have notable depth of colour and have good application properties, e.g. fastness to flocculation, crystallisation and good dispersibility.

The pigment properties can often be improved further by treating the raw pigments in organic media at an elevated temperature, e.g. 110°-200° C. Suitable organic media (in which, however, the pigments themselves are scarcely dissolved) are, for example, chlorobenzene (mixtures), nitrobenzene, dimethyl formamide, glacial acetic acid, ethylene glycol and quinoline. Treatment of this nature is, however, usually superfluous if the pigments are ground in the reaction medium during their production.

The following Examples, in which the parts are by weight and the temperatures in degrees centigrade, illustrate the invention.

EXAMPLE 1

A suspension of 32.3 parts 1-formyl-2-hydroxynaphthalene, 35.2 parts 4-phenyl-2-aminophenol and 30.7 parts anhydrous sodium acetate in 500 parts water is ground for 24 hours at room temperature after the addition of 375 parts glass beads (average diameter: 10 mm). 47.8 Parts copper sulphate pentahydrate in 150 parts water are then added to the reaction mixture and grinding is continued for 48 hours.

The glass beads are removed using a screen and the precipitate is filtered off. The product is washed with 5000 parts water at 40° and dried in a vacuum at 70°.

The pigment obtained of formula

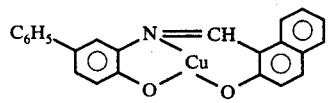

dyes PVC and varnishes in yellow shades and the dyeings have very good fastness properties.

EXAMPLE 2

32.3 Parts 1-formyl-2-hydroxynaphthalene are dissolved in 142 parts dimethyl formamide at 50° and added over the course of 30 minutes to a solution of 35.2 parts 4-phenyl-2-aminophenol in 50 parts dimethyl formamide. The solution is heated to 100° over the course of one hour and then combined, over 30 minutes, with a solution of 37.7 parts copper acetate monohydrate in 45 parts dimethyl formamide. The reaction mixture is stirred at 100° for 2 hours, cooled and filtered at room temperature. The residue is washed with 1000 parts water, then with 500 parts ethyl alcohol and dried at 70° in a vacuum. The product obtained is the same as that in Example 1 and, after usual pigment conditioning, it produces dyeings of the same shade and with the same fastness properties.

By repeating Example 1 or 2 but, in place of 1-formyl-2-hydroxynaphthalene, employing equimolar amounts of the following compounds, yellow pigments with properties similar to those of the pigment of Example 1 and 2 are obtained:

EXAMPLE 3 1-formyl-2-hydroxy-3-carboxynaphthalene
4 1-formyl-2-hydroxy-6-bromonaphthalene
5 1-formyl-2-hydroxy-6-chloronaphthalene
6 1-formyl-2-hydroxy-6-methoxynaphthalene
7 1-formyl-2-hydroxy-6-ethoxynaphthalene
8 1-formyl-2-hydroxy-3-carboxy-6-bromonaphthalene
9 1-formyl-2-hydroxy-3-phenylaminocarbonylnaphthalene
10 1-formyl-2-hydroxy-3-(2'-chloro-4'-nitrophenylaminocarbonyl)-naphthalene
11 1-formyl-2-hydroxy-3-(2',5'-dimethoxyphenylaminocarbonyl)-naphthalene
12 1-formyl-2-hydroxy-3-(2',5'-dimethylphenylaminocarbonyl)-naphthalene
13 1-formyl-2-hydroxy-3-(2',4'-dinitrophenylaminocarbonyl)-naphthalene
14 1-formyl-2-hydroxy-3-(2',3'-dichlorophenylaminocarbonyl)-naphthalene
15 1-formyl-2-hydroxy-3-(2'-bromo-4'-cyanophenylaminocarbonyl)-naphthalene
16 1-formyl-2-hydroxy-3-(4'-ethoxyphenylaminocarbonyl)-naphthalene
17 1-formyl-2-hydroxy-6-nitronaphthalene.

APPLICATION EXAMPLE 0.5 Parts of the pigment according to Example 1 and 5 parts titanium dioxide pigment are added to a basic mixture consisting of
  63 parts polyvinyl chloride emulsion,
  32 parts dioctyl phthalate,
  3 parts commercial epoxy plasticiser,
  1.5 parts stabilizer (barium-cadmium-stearate mixture, also commercial grade) and
  0.5 parts of a chelate former (commercial)
and the whole is intimately mixed.

The mixture is rolled for 8 minutes in a roller frame which is heated to 160° and has friction rollers (one roller set at 20 r.p.m., the other at 25 r.p.m.) in order to obtain better distribution of the pigment. The 0.3 mm sheet obtained which is yellow in colour is then doffed.

The dyeing shows good fastness to light and migration, and good heat-resistance.

What is claimed is:

1. A compound of formula I,

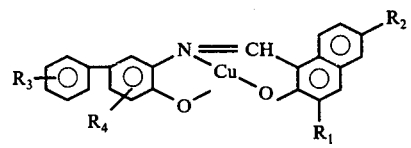

wherein
  $R_1$ is hydrogen, carboxy, or phenylaminocarbonyl, the phenyl radical of which is unsubstituted or substituted by up to 2 substituents selected from chlorine, bromine, methyl, cyano, nitro, methoxy and ethoxy,
  $R_2$ is hydrogen, chlorine, bromine, methoxy, ethoxy or nitro, and
  $R_3$ and $R_4$ are, independently, hydrogen, chlorine, bromine, methoxy or ethoxy.

2. A compound of claim 1, in which $R_2$ is hydrogen, chlorine, bromine, methoxy or ethoxy.

3. A compound of claim 1, in which $R_3$ and $R_4$ are both hydrogen.

4. A compound of claim 1, in which $R_3$ and $R_4$ are both hydrogen.

5. A compound of claim 1, in which $R_1$ is hydrogen or carboxy, $R_2$ is hydrogen, chlorine, bromine, methoxy, ethoxy or nitro and $R_3$ and $R_4$ are both hydrogen.

6. A compound of claim 5, in which $R_1$, $R_3$ and $R_4$ are all hydrogen and $R_2$ is hydrogen, chlorine, bromine, methoxy, ethoxy or nitro.

7. A compound of claim 6, in which $R_1$, $R_2$, $R_3$ and $R_4$ are all hydrogen.